US012320393B2

United States Patent
Häßler et al.

(10) Patent No.: US 12,320,393 B2
(45) Date of Patent: Jun. 3, 2025

(54) TORSIONAL VIBRATION DAMPER COMPRISING A FRICTION DEVICE

(71) Applicant: Schaeffler Technologies AG & Co. KG, Herzogenaurach (DE)

(72) Inventors: Martin Häßler, Graben-Neudorf (DE); Alain Rusch, Gambsheim (FR); Timm Gmeiner, Karlsruhe (DE); Thorsten Hartmann, Kappelrodeck (DE)

(73) Assignee: Schaeffler Technologies AG &Co. KG, Herzogenaurach (DE)

(*) Notice: Subject to any disclaimer, the term of this patent is extended or adjusted under 35 U.S.C. 154(b) by 466 days.

(21) Appl. No.: 17/797,158

(22) PCT Filed: Jan. 29, 2021

(86) PCT No.: PCT/DE2021/100087
§ 371 (c)(1),
(2) Date: Aug. 3, 2022

(87) PCT Pub. No.: WO2021/170171
PCT Pub. Date: Sep. 2, 2021

(65) Prior Publication Data
US 2023/0048844 A1    Feb. 16, 2023

(30) Foreign Application Priority Data
Feb. 27, 2020   (DE) .................. 10 2020 105 144.1

(51) Int. Cl.
*F16D 3/12*    (2006.01)
*F16F 15/129*    (2006.01)

(52) U.S. Cl.
CPC ............ *F16D 3/12* (2013.01); *F16F 15/1292* (2013.01); *F16D 2300/22* (2013.01);
(Continued)

(58) Field of Classification Search
CPC ...... F16D 3/12; F16D 2300/22; F16F 15/292; F16F 2222/04; F16F 2228/066; F16F 2232/02; F16F 2236/08
See application file for complete search history.

(56) References Cited

U.S. PATENT DOCUMENTS 4,634,398 A    1/1987   Valeo
4,887,485 A *  12/1989  Kobayashi ............ F16F 15/139
                                              192/214.1
(Continued)

FOREIGN PATENT DOCUMENTS

CN    1946953 A    4/2007
CN    103122970 A   5/2013
(Continued)

OTHER PUBLICATIONS

Author: Wang Cuifeng, Dong Wu Title: Design and Study of Large-angle Vibration-damping Clutch Disc Assembly Sourc: Development & Innovation of Machinery & Electrical Products Date: Jul. 28, 2009, Vo. 22, No. 4, 12 Pages.

*Primary Examiner* — Thomas C Diaz

(57) ABSTRACT

A friction device for a torsional vibration damper includes an axis of rotation, an input side with a first disc and a second disc, and an output side between the first disc and the second disc and rotatable relative to the input side. The output side has a first friction disc, a second friction disc, and a spring element between the first friction disc and the second friction disc. The spring element has first, second and third contact regions. At a first angle of rotation between the input side and the output side, an axial contact force between the first friction disc and the second friction disc is transmittable via the first contact region and the third contact region. At a second angle of rotation, different than the first
(Continued)

angle of rotation, the axial contact force is transmittable via the second contact region and the third contact region.

20 Claims, 4 Drawing Sheets

(52) U.S. Cl.
CPC ..... *F16F 2222/04* (2013.01); *F16F 2228/066* (2013.01); *F16F 2232/02* (2013.01); *F16F 2236/08* (2013.01); *Y10T 74/213* (2015.01)

(56) References Cited

U.S. PATENT DOCUMENTS

| | | | |
|---|---|---|---|
| 6,026,710 | A | 2/2000 | Orlamuender |
| 6,119,548 | A * | 9/2000 | Murphy ............ F16F 15/13171 464/68.5 |
| 2012/0115619 | A1 | 5/2012 | Takenaka |

FOREIGN PATENT DOCUMENTS

| | | | | |
|---|---|---|---|---|
| CN | 104508319 | A | 4/2015 | |
| CN | 104755800 | A | 7/2015 | |
| CN | 109058317 | A | 12/2018 | |
| DE | 3506350 | A1 | 10/1985 | |
| DE | 102009002968 | A1 | 11/2010 | |
| DE | 102014218498 | A1 | 4/2015 | |
| DE | 202014003534 | U1 | 7/2015 | |
| DE | 102015211899 | A1 | 12/2016 | |
| DE | 102016221550 | A1 | 5/2018 | |
| DE | 102018107426 | A1 | 10/2018 | |
| DE | 102018108414 | A1 | 10/2019 | |
| EP | 1650471 | A1 * | 4/2006 | .......... F16F 15/1292 |
| EP | 2711586 | A2 | 3/2014 | |
| FR | 2579709 | A1 * | 3/1986 | ............ F16F 15/139 |
| FR | 3011298 | A1 | 4/2015 | |
| GB | 2315111 | A | 1/1998 | |
| JP | S59164418 | A | 9/1984 | |
| JP | H08303482 | A | 11/1996 | |
| JP | 2000320629 | A | 11/2000 | |
| JP | 2005207551 | A | 8/2005 | |
| JP | 2016017604 | A | 2/2016 | |
| KR | 20110072881 | A | 6/2011 | |
| SE | 9302697 | L | 2/1994 | |
| WO | 2011055442 | A1 | 5/2011 | |
| WO | 2019192645 | A1 | 10/2019 | |

* cited by examiner

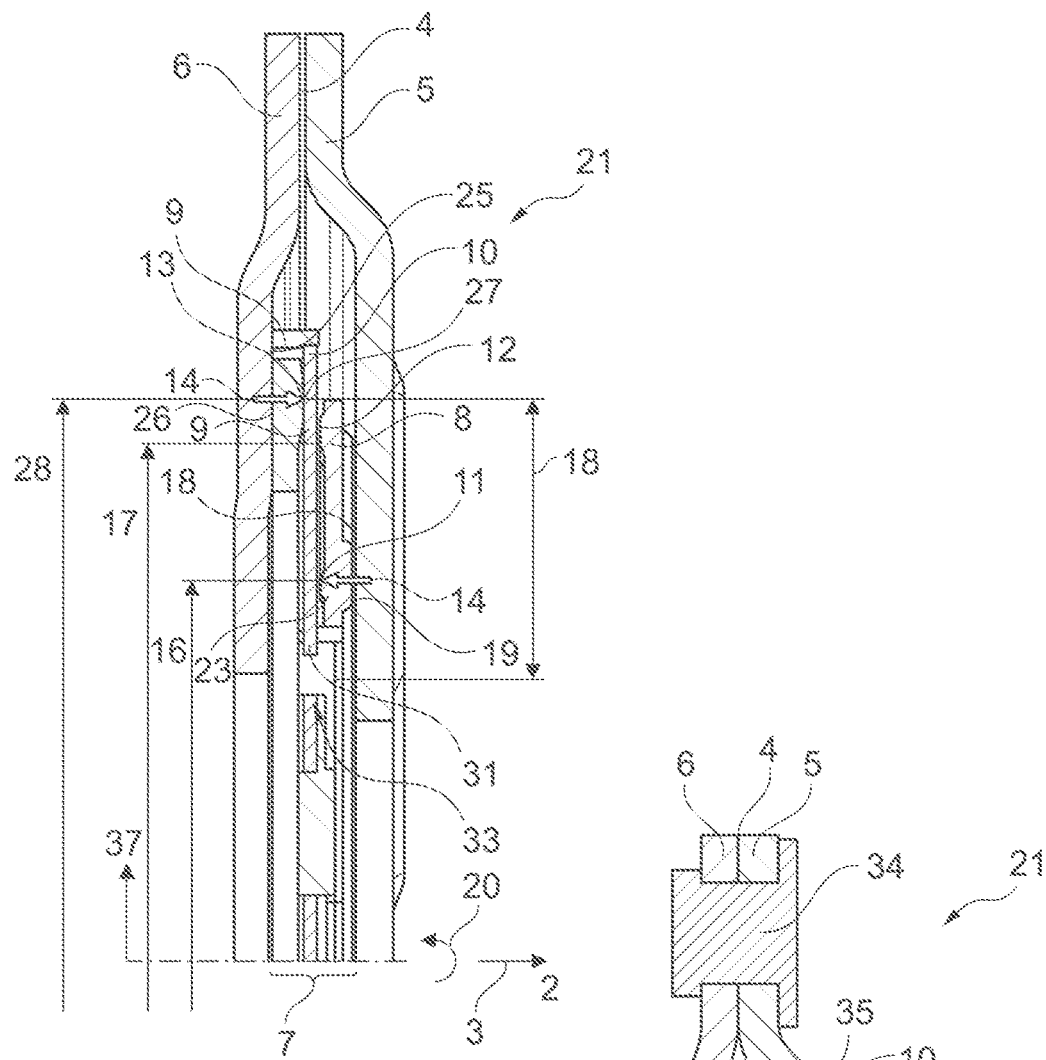
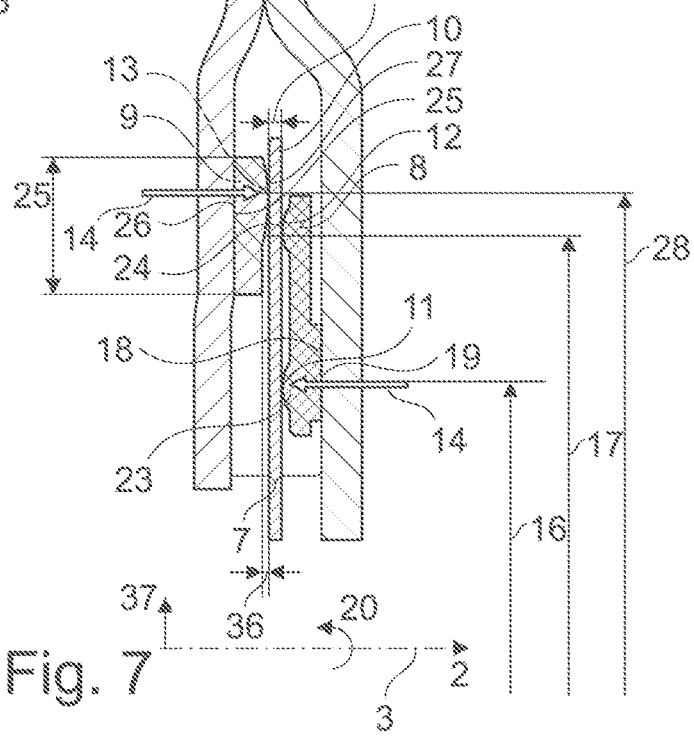

TORSIONAL VIBRATION DAMPER COMPRISING A FRICTION DEVICE

CROSS-REFERENCE TO RELATED APPLICATIONS

This application is the United States National Phase of PCT Appln. No. PCT/DE2021/100087 filed Jan. 29, 2021, which claims priority to German Application No. DE102020105144.1 filed Feb. 27, 2020, the entire disclosures of which are incorporated by reference herein.

TECHNICAL FIELD

The present disclosure relates to a torsional vibration damper including a friction device having an axis of rotation extending in an axial direction. The torsional vibration damper including a friction device can be used in the drive train of a motor vehicle.

BACKGROUND

Friction devices are used in torsional vibration dampers in order to apply a friction torque to the relative rotation between an input side and an output side in a targeted manner in order to appropriately withdraw energy from the oscillating system and thereby dampen it.

The torsional vibration dampers are used in particular to reduce torsional vibrations in a drive train. Torsional vibration dampers are torsional resiliencies introduced in a target manner in a drive train that is excited with periodic disturbances. The aim here is to shift the disruptive vibrational resonances that occur in various operating situations to a speed range below the operating speeds as far as possible. Vibrational resonances remaining within the operating speed range are dampened by an external or integrated friction device, the friction torque of which must be within defined limits. The friction device can in particular be designed to be independent of the torsional flexibility.

Use of an axially acting energy store as a friction device, e.g., a corrugated washer or a disc spring, is known, which is arranged together with a matching friction ring and possibly a support disc axially between components that are connected to the input side and output side. The axial force of the energy store in the installed position, the friction radius of the friction element and the coefficient of friction of the material pair define a friction torque that is substantially constant over the relative rotation. For different operating points or driving conditions that require different friction torque levels, multiple friction devices designed for different friction torques are provided, which each experience their relative rotation in the associated rotation angle range of the torsional vibration damper.

WO 2019/192645 A1 discloses a clutch disc with a torsional vibration damper designed as a pendulum rocker damper. The input part and the output part of the pendulum rocker damper can be rotated relative to one another. The rotation takes place against the spring action of a spring unit and is dampened by a friction device.

A torsional vibration damper is known from DE 10 2015 211 899 A1, in which a spring device is arranged outside the torque path between the input part and the output part.

DE 10 2014 218 498 A1 discloses a torsional vibration damper. An input element is connected to a first friction element and an output element, which can be rotated relative to the input element, is connected to a second friction element. According to the angle of rotation, the friction elements make contact with one another at contact diameters that are different from one another. When subjected to a constant axial force from a spring element, in the event of relative rotation, the variable friction radius or contact diameter results in a friction torque that is dependent on the angle of rotation.

If there is only limited radial installation space available for a friction device, only limitedly differing levels for the resulting friction torque can be set simply by varying the friction radius between one and the same friction partners. In hardly any case will it be possible to more than double the friction torque.

SUMMARY

The present disclosure provides a torsional vibration damper that at least partially alleviates the problems described at the outset. In an example embodiment, a torsional vibration damper including a friction device with a friction torque dependent on the angle of rotation is to be provided in a compact installation space, the highest friction torque of which can be a multiple of the lowest friction torque. Such friction devices are required in particular when significantly different friction torque levels are required in different rotation angle ranges of the torsional vibration damper, which are associated with different operating points or driving conditions, in order to be able to ensure, for example, noise comfort and service life of the drive train components, and the friction torque for this purpose should arise in the event of relative rotation between one and the same friction partners.

A torsional vibration damper including a friction device having an axis of rotation extending in an axial direction is proposed. The friction device has an input side with a first disc and a second disc as well as an output side which is arranged between the discs in the axial direction, can be rotated relative to the input side and has a first friction disc and a second friction disc. The output side has a spring element with a plurality of contact regions. The spring element is arranged in the axial direction between the friction discs, and a contact force acting in the axial direction at least between the friction discs can be transmitted via the contact regions. According to an angle of rotation between the input side and the output side, the contact force can be transmitted at least via a first contact region or a second contact region, which are arranged on diameters that are different from one another and contact the same friction disc.

The torsional vibration damper including the friction device can be used, for example, in the drive train of a motor vehicle.

In an example embodiment, vibrations are introduced into the friction device via the input side or the output side and passed on (dampened) via the other of the input side and the output side.

The spring element is, for example, a disc-like disc spring.

The possible angle of rotation between the input side and the output side is, for example, between zero and 180 degrees, between zero and 120 degrees or between zero and 90 degrees.

The first friction disc contacts the spring element, for example, either via a first contact region or a second contact region. The second friction disc contacts the spring element, for example, via a third contact region.

The proposed friction device makes it possible, for example, for the force acting in the axial direction and thus the friction torque to change in that, according to the angle of rotation between the input side and the output side, different diameters of the spring element are contacted via at least one friction disc. If the contact regions of the different friction discs, i.e., the first contact region and the third contact region, for example, are spaced far apart from one another in the radial direction, a comparatively low axial force is transmitted by the spring element. If the contact regions of the different friction discs, i.e., the second contact region and the third contact region, for example, are close to each other in the radial direction, a comparatively high axial force is transmitted by the spring element. In contrast to the principle of varying a friction radius, e.g., known from DE 10 2014 218 498 A1, owing to the principle of a modulated axial force, as proposed here, a maximum friction torque can be produced according to the angle of rotation which is a multiple of the lowest friction torque.

In an example embodiment, different contact regions can be realized by the two friction discs. At least one of the friction discs may also have more than two different contact regions. For example, a large number of combinations of contact regions of different friction discs with one another can be realized in this way so that the friction torque can assume numerous different values.

For an exemplary friction direction, for example, the first contact region between the spring element and the first friction disc can be on a first diameter of, for example, 40 millimeters, while the second contact region between the spring element and the first friction disc is arranged on a second diameter of, for example, 56 millimeters. A third contact region between the spring element and the second friction disc is, for example, on a third diameter of 60 millimeters.

In an example embodiment, the second diameter is between 99 and 90% of the third diameter, while the first diameter is between 80% and 60%, e.g., between 70% and 60% of the third diameter.

In an example embodiment, the first and second diameters are smaller than the third diameter.

In an example embodiment, at least the first disc has a plurality of first contact zones, pointing in the axial direction, for contacting at least one opposite first friction zone of the first friction disc in the axial direction, the first contact zones being spaced apart from one another in a circumferential direction.

In an example embodiment, the at least one first friction zone is arranged in the circumferential direction in diameter regions that are different from one another. The first friction zone may be formed by elevations on the first friction disc which extend in the axial direction from an otherwise flat surface. The first friction zone may be continuous in the circumferential direction and extend in a meandering manner over different diameter regions. The first friction zone may extend over certain angular ranges only in a first diameter region and over certain other angular ranges only in a second diameter region.

In an example embodiment, the first friction disc has at least one first inner contact element for contacting the first contact region of the spring element and at least one first outer contact element for contacting the second contact region.

A contact element can, for example, be formed by an elevation on the first friction disc that extends from an otherwise flat running surface in the axial direction. The first and/or second contact element may extend in the circumferential direction only over a limited angular range. This elevation may be designed with a constant height in the circumferential direction. The elevation may be designed in the form of a dome in the radial direction, that is to say it has a curved profile.

In an example embodiment, first outer and/or first inner contact elements are arranged in a defined position relative to the first friction zone.

In an example embodiment, the first friction disc has at least a plurality of first inner contact elements which are arranged at a distance from one another in the circumferential direction.

In an example embodiment, each first inner contact element is arranged at least partially in alignment with the at least one first friction zone in the axial direction.

In an example embodiment, the second disc has a second contact zone, running circumferentially in a circumferential direction and pointing in the axial direction, for contacting an opposite second friction zone of the second friction disc in the axial direction.

In an example embodiment, the second friction disc for contacting a third contact region of the spring element has a second contact element, running circumferentially in a circumferential direction.

In an example embodiment, the at least one second contact element is arranged on a largest diameter via which the contact force in the friction device can be transmitted.

In an example embodiment, the spring element is form-fittingly connected to each friction disc with respect to a circumferential direction. The spring element may have first tongues which extend outwards in the radial direction and which interact form-fittingly with first recesses in the second friction disc in relation to the circumferential direction. The spring element may have second tongues which extend inwards in the radial direction and which interact form-fittingly with second recesses in the first friction disc in relation to the circumferential direction.

In an example embodiment, the second tongues also interact form-fittingly with a hub in relation to the circumferential direction, such that the friction device can be connected in a rotationally fixed manner with a hub via the second tongues.

In an example embodiment, the spring element designed as a disc spring has a ratio between the unstressed height and the material thickness of the disc spring in the force edge of the disc spring, for which the following applies: $1.25 < \text{height/material thickness} < 1.55$.

In an example embodiment, the friction discs are made of a fiber-reinforced polymer material.

The torsional vibration damper including the friction device can, for example, be connected to a clutch disc. The clutch disc may be part of a friction clutch which has at least one counter-plate and a pressure plate which can be displaced in the axial direction. The clutch disc or the friction lining of the clutch disc is arranged between the counter-plate and the pressure plate. The friction clutch is used, for example, in a drive train of a motor vehicle.

The torsional vibration damper is used, for example, to reduce torsional vibrations in a drive train.

The use of indefinite articles ("a" and "an"), especially in the patent claims and the description reproducing them, is to be understood as such and not as a numeral. The terms or components introduced in this way are therefore to be understood in such a way that they are present at least once and, in particular, can also be present several times.

As a precaution, it should be noted that the numerals used here ("first", "second", etc.) serve primarily (only) to distinguish between several similar objects, sizes, or processes, and, in particular, do not necessarily specify any dependency and/or sequence of these objects, sizes or processes with respect to one another. If a dependency and/or sequence is necessary, this is explicitly stated here or results in a manner obvious to the person skilled in the art when studying the specifically described configuration. If a component can occur several times ("at least one"), the description of one of these components can apply equally to all or part of the majority of these components, but this is not mandatory.

BRIEF DESCRIPTION OF THE DRAWINGS

Both the disclosure and the technical field are explained in more detail below with reference to the accompanying figures. It should be noted that the disclosure is not intended to be limited by the exemplary embodiments shown. In particular, unless explicitly stated otherwise, it is also possible to extract partial aspects of the substantive matter outlined in the figures and to combine them with other components and knowledge from the present description and/or figures. In particular, it should be noted that the figures and in particular the proportions shown are only schematic. In the figures:

FIG. 6 shows the friction device according to FIGS. 1 to 3 in a side view in section, in a first state;

FIG. 7 shows the friction device according to FIG. 6 in a further side view in section;

DETAILED DESCRIPTION

Figure 1:
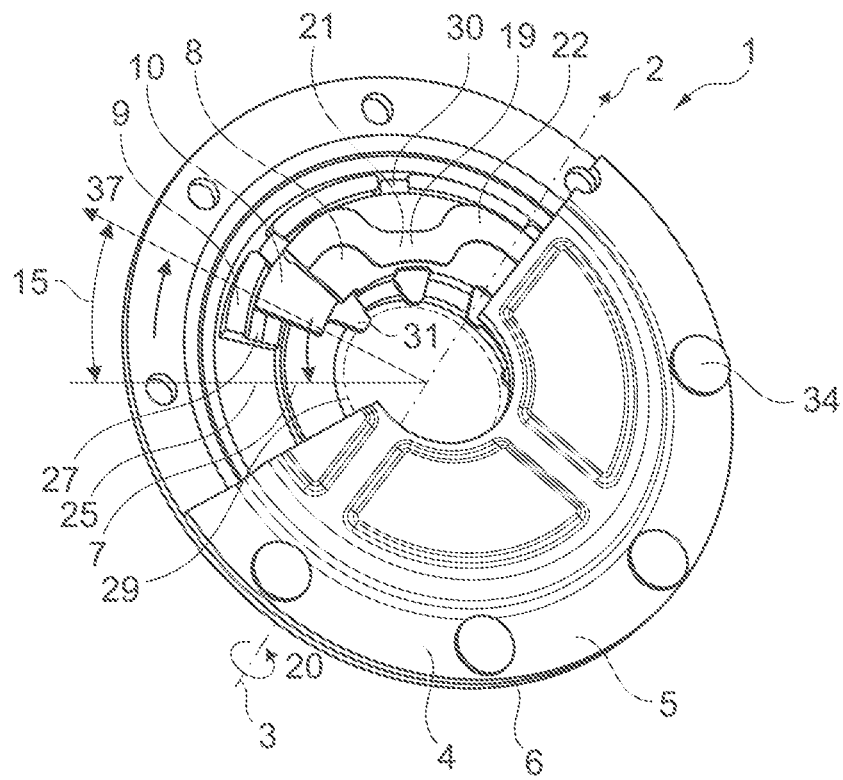
FIG. 1 shows a friction device in a perspective view, at least partially in section.

FIGS. 1 to 9 are described together below.

A torsional vibration damper including a friction device 1 comprises an axis of rotation 3 extending in an axial direction 2. The friction device 1 has an input side 4 with a first disc 5 and a second disc 6 as well as an output side 7 which is arranged in the axial direction 2 between the discs 5, 6, can be rotated relative to the input side 4 and which has a first friction disc 8 and a second friction disc 9. The output side 7 has a spring element 10 in the form of a disc spring with a plurality of contact regions 11, 12, 13, and the spring element 10 is arranged in the axial direction 2 between the friction discs 8, 9. A contact force 14 (see FIGS. 6 to 9) acting in the axial direction 2, at least between the friction discs 8, 9, can be transmitted via the contact regions 11, 12, 13. The contact force 14 can be transmitted according to an angle of rotation 15 (see FIG. 1) between the input side 4 and the output side 7 via a first contact region 11 (see first state of the friction device 1 in FIGS. 6 and 7) or a second contact region 12 (see second state of the friction device 1 in FIGS. 8 and 9), which are arranged on diameters 16, 17 which are different from one another and contact the same first friction disc 8.

The discs 5, 6 on the input side 4 are connected to one another via connecting elements 34 designed as rivets.

The first friction disc 8 contacts the spring element 10 either via a first contact region 11 or a second contact region 12. The second friction disc 9 contacts the spring element 10 via a third contact region 13.

The proposed friction device 1 makes it possible for the force acting in the axial direction 2—and thus the friction torque—to change in that, according to the angle of rotation 15 between the input side 4 and the output side 7, different diameters 16, 17 of the spring element 10 are contacted via the first friction disc 8. If the contact regions 11, 13 of the different friction discs 8, 9, here the first contact region 11 and the third contact region 13, are spaced far apart from one another in the radial direction 37, a comparatively low contact force 14 is transmitted by the spring element 10. If the contact regions 12, 13 of the different friction discs 8, 9, here the second contact region 12 and the third contact region 13, are close together in the radial direction 37, a comparatively high contact force 14 is transmitted by the spring element 10.

The first disc 5 on the input side 4 has a plurality of first contact zones 18, pointing in the axial direction 2 (see, for example, FIG. 3), for contacting the opposite first friction zone 19 in the axial direction 2 of the first friction disc 8, wherein the first contact zones 18 are arranged spaced apart from one another in a circumferential direction 20.

The first friction zone 19 is arranged in the circumferential direction 20 in diameter regions 21, 22 which are different from one another. The first friction zone 19 is formed by elevations on the first friction disc 8 which extend in the axial direction 2 from an otherwise flat surface. The first friction zone 19 is continuous in the circumferential direction 20 and extends in a meandering manner over different diameter regions 21, 22. The first friction zone 19 extends over certain angular ranges only in an inner first diameter region 21 and over certain other angular ranges only in an outer second diameter region 22.

The first friction disc 8 has a plurality of first inner contact elements 23 for contacting the first contact region 11 of the spring element 10 and a first outer contact element 24, running circumferentially in the circumferential direction 20, for contacting the second contact region 12.

Each contact element 23, 24 is formed by an elevation on the first friction disc 8 and extends in the axial direction 2 from an otherwise flat surface. The first inner contact element 23 extends in the circumferential direction 20 only over a limited angular range. This elevation of the first inner contact element 23 has a constant height in the circumferential direction 20. The elevations of the contact elements 23, 24 are designed in the shape of a dome in the radial direction 37, i.e., they have a curved profile.

Figures 4, 5:
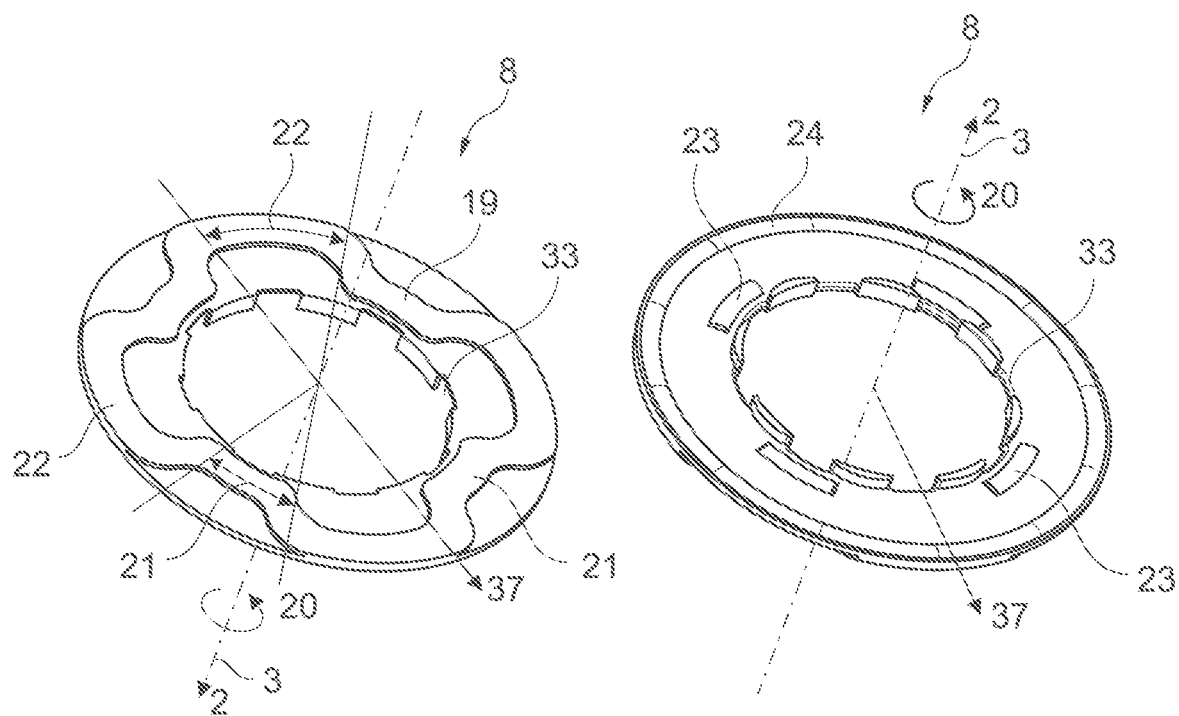
FIG. 4 shows a first friction disc of the friction device according to FIGS. 1 to 3, in a first perspective view.
FIG. 5 shows the first friction disc according to FIG. 4 in a second perspective view.
Figure 8:
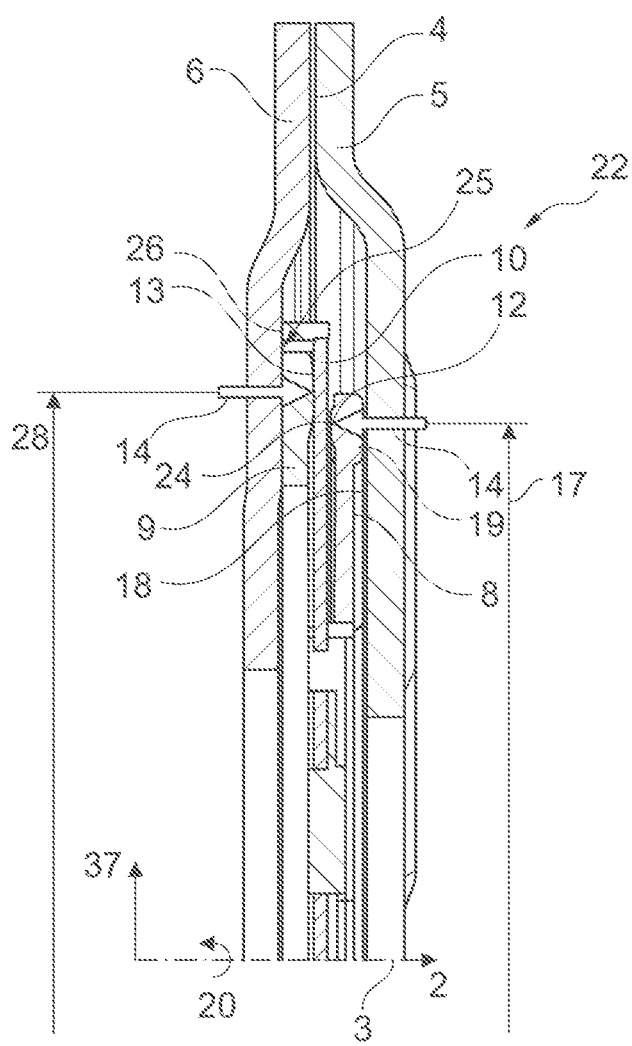
FIG. 8 shows the friction device according to FIGS. 1 to 3 in a side view in section, in a second state.

Each first inner contact element 23 is located in a fixed position relative to the first friction zone 19 (see, for example, FIG. 5). The first friction disc 8 has a plurality of first inner contact elements 23 which are arranged spaced apart from one another in the circumferential direction 20. Each first inner contact element 23 is arranged completely aligned with the first friction zone 19 in the axial direction 2.

The second disc 6 on the input side 4 has a second contact zone 25 (see FIGS. 1 and 2), running circumferentially in a circumferential direction 20 and pointing in the axial direction 2, for contacting an opposite second friction zone 26 of the second friction disc 9 in the axial direction 2.

Figure 2:
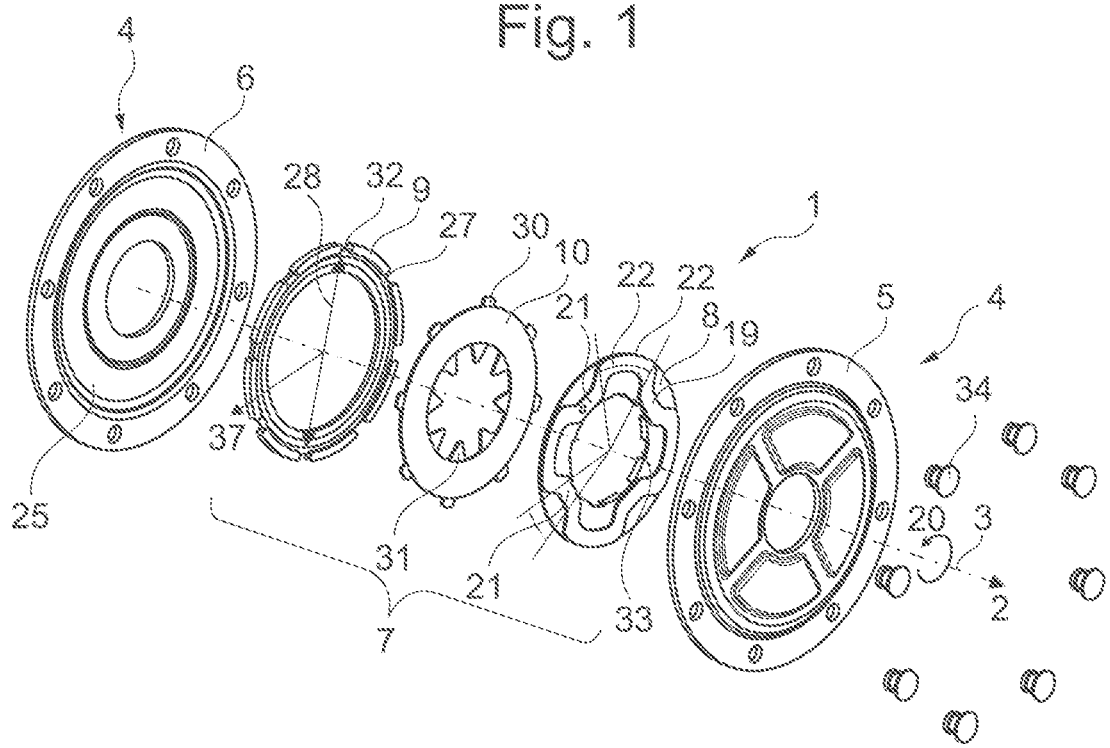
FIG. 2 shows the friction device according to FIG. 1 in a first exploded view, in a perspective view.
Figure 3:
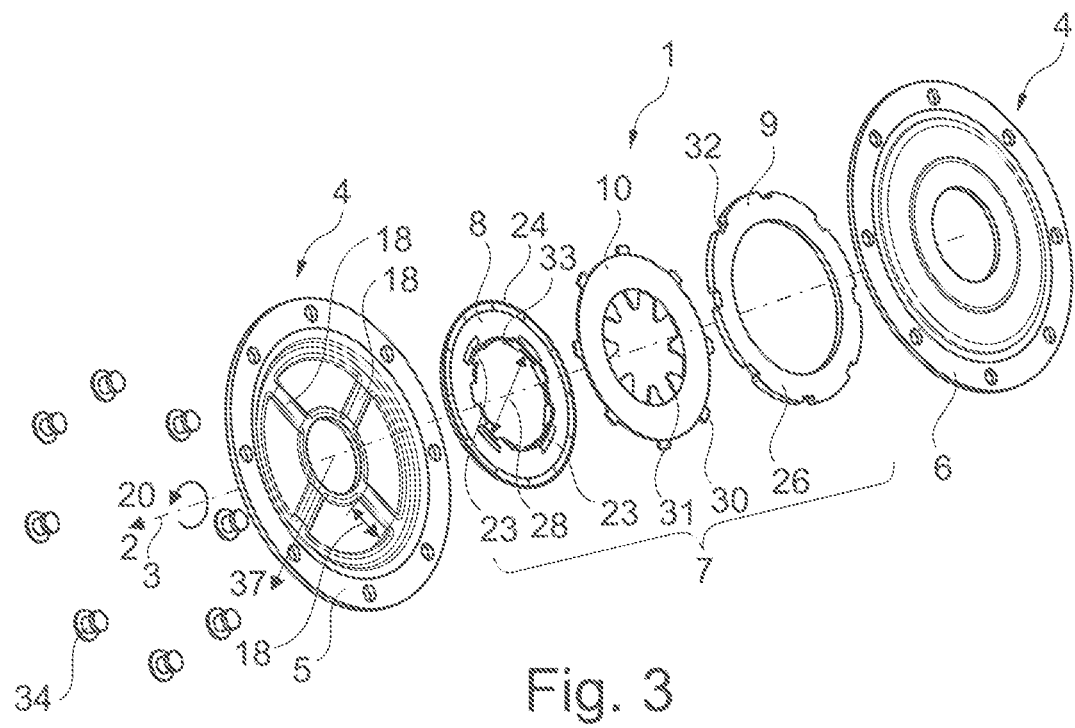
FIG. 3 shows the friction device according to FIGS. 1 and 2 in a second exploded view, in perspective view.
Figure 9:
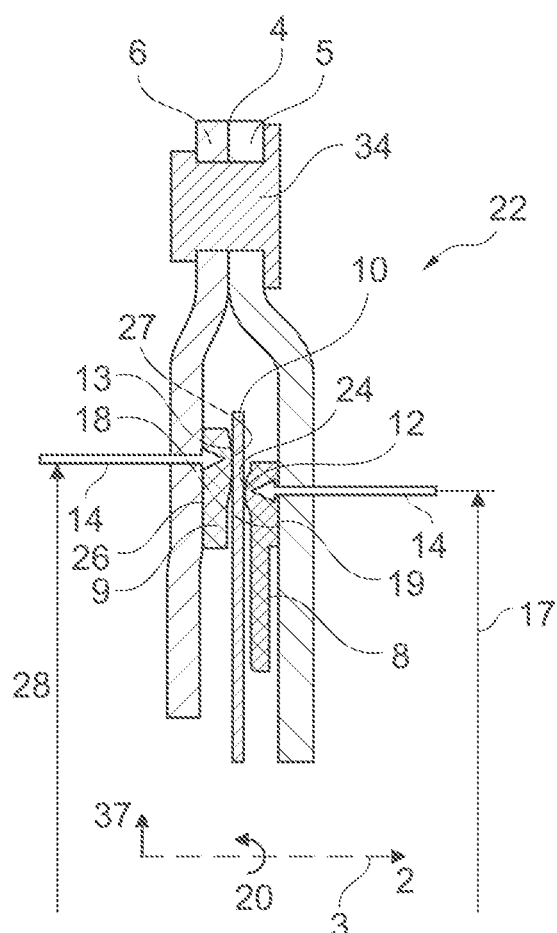
FIG. 9 shows the friction device according to FIG. 8 in a further side view in section.

For contacting a third contact region 13 of the spring element 10, the second friction disc 9 has a second contact element 27 running in a circumferential direction 20 (see FIGS. 1, 2 and 9).

The second contact element 27 is arranged on a largest diameter 28 (see FIGS. 6 to 9), via which the contact force 14 in the friction device 1 can be transmitted.

The spring element 10 is form-fittingly connected to each friction disc 8, 9 with respect to a circumferential direction 20. The spring element 10 has first tongues 30 which extend outwards in the radial direction 37 and interact form-fittingly with the first recesses 32 of the second friction disc 9 with respect to the circumferential direction 20. Furthermore, the spring element 10 has second tongues 31 which extend inward in the radial direction 37 and which interact form-fittingly with the second recesses 33 of the first friction disc 8 with respect to the circumferential direction 20.

The second tongues 31 also interact form-fittingly with a hub 29 (see FIG. 1) in relation to the circumferential direction 20, such that the friction device 1 can be connected to a hub 29 in a rotationally fixed manner via the second tongues 31.

The spring element 10 designed as a disc spring has a ratio between the unstressed height 36 and the material thickness 35 of the disc spring in the force edge of the disc spring, for which the following applies: 1.25<height/material thickness<1.55 (see FIG. 7, shown there only as an example because the spring element 10 is not in an unstressed state).

FIGS. 6 to 9 show the different states of the friction device 1. In the first state shown in FIGS. 6 and 7, the contact force 14 is transmitted via the first contact region 11 and the third contact region 13. The first contact region 11 is disposed on a first diameter 16, and the third contact region 13 is disposed on a largest (third) diameter 28. In the second state shown in FIGS. 8 and 9, the contact force 14 is transmitted via the second contact region 12 and the third contact region 13. The second contact region 12 is disposed on a second diameter 17, and the third contact region 13 is disposed on the largest (third) diameter 28. For an exemplary friction device 1, for example, the first contact region 11 between the spring element 10 and the first friction disc 8 can be disposed on a first diameter 16 of, for example, 40 millimeters, while the second contact region 12 between the spring element 10 and the first friction disc 8 is arranged on a second diameter 17 of, for example, 56 millimeters. A third contact region 13 between the spring element 10 and the second friction disc 9 is disposed, for example, on a largest (third) diameter 28 of 60 millimeters.

REFERENCE NUMERALS

1 Friction device
2 Axial direction
3 Axis of rotation
4 input side
5 First disc
6 Second disc
7 Output side
8 First friction disc
9 Second friction disc
10 Spring element
11 First contact region
12 Second contact region
13 Third contact region
14 Contact force
15 Angle of rotation
16 First diameter
17 Second diameter
18 First contact zone
19 First friction zone
20 Circumferential direction
21 First diameter region
22 Second diameter region
23 First inner contact element
24 First outer contact element
25 Second contact zone
26 Second friction zone
27 Second contact element
28 Largest diameter
29 Hub
30 First tongue
31 Second tongue
32 First recess
33 Second recess
34 Connecting element
35 Material thickness
36 Height
37 Radial direction

The invention claimed is:

1. A torsional vibration damper comprising a friction device, comprising an axis of rotation extending in an axial direction, wherein the friction device has an input side comprising a first disc and a second disc as well as an output side which is arranged between the discs in the axial direction, can be rotated relative to the input side and which has a first friction disc and a second friction disc, wherein the output side has a spring element comprising a plurality of contact regions, wherein the spring element is arranged in the axial direction between the friction discs, and a contact force acting in the axial direction at least between the friction discs can be transmitted via the contact regions; and wherein, according to an angle of rotation between the input side and the output side, the contact force can be transmitted at least via a first contact region or a second contact region, which are arranged at diameters that are different from one another and contact the same friction disc.

2. The torsional vibration damper comprising the friction device according to claim 1, wherein at least the first disc has a plurality of first contact zones, pointing in the axial direction, for contacting at least one opposite first friction zone of the first friction disc in the axial direction, wherein the first contact zones are spaced apart from one another in a circumferential direction.

3. The torsional vibration damper comprising the friction device according to claim 2, wherein the at least one first friction zone is arranged in the circumferential direction in diameter regions which are different from one another.

4. The torsional vibration damper comprising the friction device according to claim 3, wherein the first friction disc has at least one first inner contact element for contacting the first contact region of the spring element and at least one first outer contact element for contacting the second contact region.

5. The friction torsional vibration damper comprising the friction device according to claim 4, wherein the first friction disc has at least a plurality of first inner contact elements which are arranged spaced apart from one another in the circumferential direction.

6. The torsional vibration damper comprising the friction device according to claim 5, wherein each first inner contact element is arranged at least partially in alignment comprising the at least one first friction zone in the axial direction.

7. The torsional vibration damper comprising the friction device according to claim 1, wherein the second disc has a second contact zone, running circumferentially in a circumferential direction and pointing in the axial direction, for contacting an opposite second friction zone of the second friction disc in the axial direction.

8. The torsional vibration damper comprising the friction device according to claim 1, wherein the second friction disc has a second contact element, running circumferentially in a circumferential direction, for contacting a third contact region of the spring element.

9. The torsional vibration damper comprising the friction device according to claim 8, wherein the second contact element is arranged on a largest diameter, via which the contact force in the friction device can be transmitted.

10. The torsional vibration damper comprising the friction device according to claim 1, wherein the spring element is form-fittingly connected to each friction disc with respect to a circumferential direction.

11. A friction device for a torsional vibration damper comprising:
- an axis of rotation extending in an axial direction;
- an input side comprising:
  - a first disc; and
  - a second disc; and
- an output side arranged axially between the first disc and the second disc and rotatable relative to the input side, the output side comprising:
  - a first friction disc;
  - a second friction disc; and
  - a spring element arranged axially between the first friction disc and the second friction disc, the spring element comprising:
    - a first contact region;
    - a second contact region; and
    - a third contact region, wherein:
- at a first angle of rotation between the input side and the output side, an axial contact force between the first friction disc and the second friction disc is transmittable via the first contact region and the third contact region;
- at a second angle of rotation between the input side and the output side, different than the first angle of rotation, the axial contact force is transmittable via the second contact region and the third contact region; and
- the first contact region and the second contact region are arranged at different diameters and both contact the first friction disc.

12. The friction device of claim 11 wherein:
the first friction disc comprises a first friction zone; and
the first disc comprises:
  a first axially raised first contact zone, arranged to contact the first friction zone; and
  a second axially raised first contact zone, circumferentially offset from the first axially raised first contact zone and arranged to contact the first friction zone.

13. The friction device of claim 12 wherein the first friction zone is circumferentially arranged in different diameter regions.

14. The friction device of claim 13 wherein the first friction disc further comprises:
  an inner contact element arranged to contact the first contact region; and
  an outer contact element arranged to contact the second contact region.

15. The friction device of claim 14 wherein the first friction disc comprises a plurality of inner contact elements circumferentially spaced apart from one another.

16. The friction device of claim 15 wherein each one of the plurality of inner contact elements is at least partially aligned with the first friction zone in the axial direction.

17. The friction device of claim 11 wherein:
the second friction disc comprises a second friction zone; and
the second disc comprises an axially raised circumferentially extending second contact zone arranged to contact the second friction zone.

18. The friction device of claim 17 wherein the second friction disc further comprises a circumferentially extending second contact element arranged to contact the third contact region.

19. The friction device of claim 18 wherein the second contact element is arranged on a largest diameter at which the axial contact force can be transmitted.

20. The friction device of claim 11 wherein the spring element is form-fittingly connected to the first friction disc and to the second friction disc in a circumferential direction.

* * * * *